United States Patent Office.

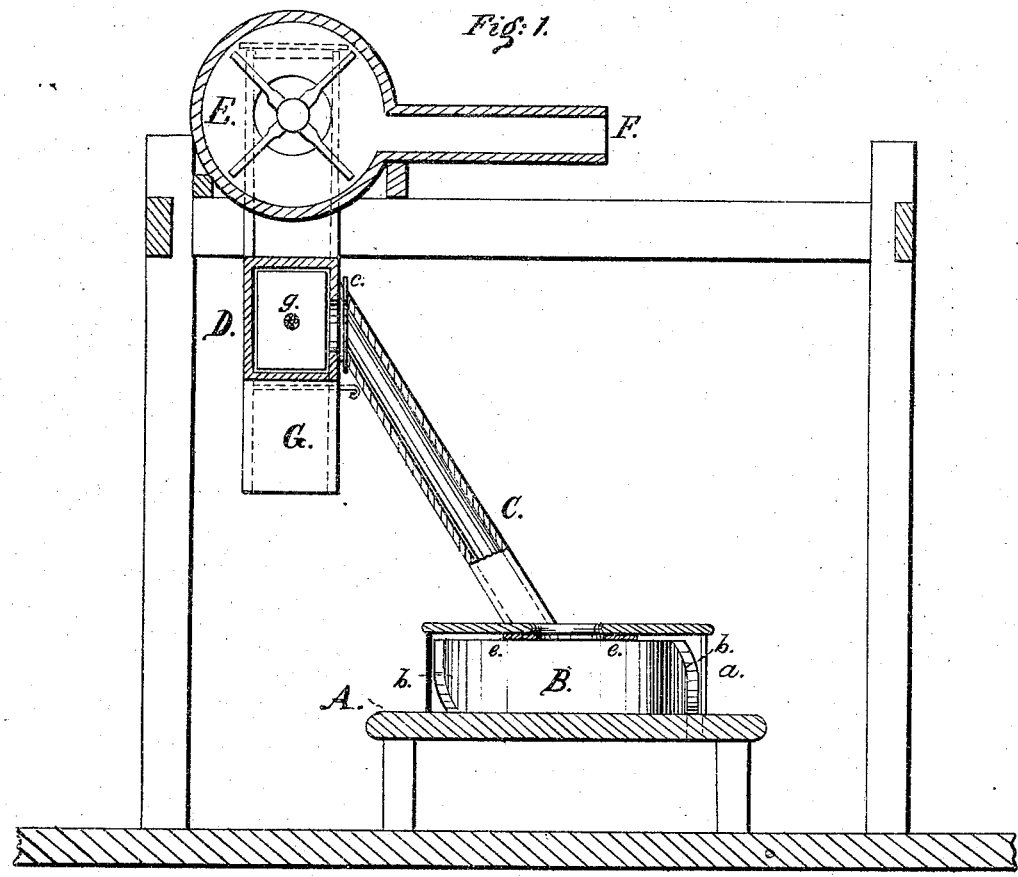

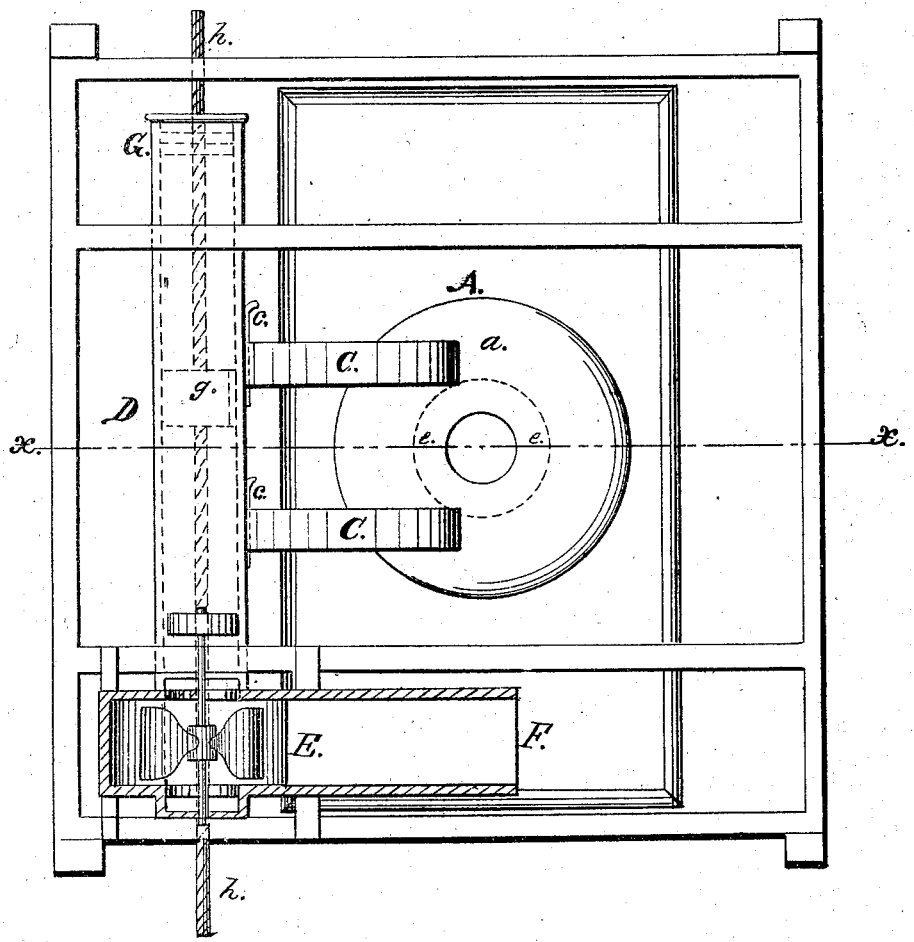

JOHN GRAY, OF DUBUQUE, IOWA.

Letters Patent No. 70,198, dated October 29, 1867.

IMPROVEMENT IN VENTILATING MILLSTONES.

*The Schedule referred to in these Letters Patent and making part of the same.*

TO ALL WHOM IT MAY CONCERN:

Be it known that I, JOHN GRAY, of Dubuque, in the county of Dubuque, and State of Iowa, have invented a new and improved Flour-Cooler and Condenser; and I do hereby declare that the following is a full, clear, and exact description thereof, which will enable others skilled in the art to make and use the same, reference being had to the accompanying drawings, forming part of this specification, in which—

Figure 1 is a vertical section of my invention, taken in the line $x\,x$, fig. 2.

Figure 2, a top view.

Similar letters of reference indicate like parts.

This invention relates to a new and useful improvement in apparatus for cooling flour and the stones of a mill when grinding, and condensing the moist vapors or steam which are generated in the process of grinding grain; and it consists in connecting a fan-blower with a pair of millstones in such manner that the hot air shall be drawn from the curb or case after it has passed between the stones when grinding, while a current of fresh air is drawn through the eye with the grain. Provision is also made for condensing the vapor or steam produced in grinding.

It has always been the study of millers to grind as cool as possible, and various devices have been employed for effecting this object. The vapor or steam which arises more or less, according to the quality of grain, in the process of grinding, is very prejudicial to the quality of the flour when it condenses in it, gathering about the burrs and the curb, and clogging the bolting-cloths with moisture, and at the same time imparting a bluish dirty color to the flour when condensed in great quantity. The heat generated in grinding, as well as the moisture of the condensed steam, also interferes with the packing of the flour, and renders it liable to fermentation.

By my improved method of exhausting the air from the curbs after it has passed between the stones all the heated air and steam are withdrawn as rapidly as they are produced, and a current of cool air is constantly passing through the stones and the flour while grinding, keeping both at a low temperature, and extracting all the moisture. By this means the quality of the flour is not only much improved, but the stones work better and grind faster, being aided by the current of air passing between them to discharge more easily. The flour is discharged dry, and does not gather about the curb, nor clog the bolts, and, being cool, it can be packed quickly, and without danger of spoiling. There is also a considerable saving effected in fine flour, and the mill is not choked with flour dust to the injury of the health of millers.

A represents a pair of millstones, surrounded as usual by a curb, $a$. The runner B is provided with two long wings or wipers, $b\,b$, placed on opposite sides of the periphery, and sloping back from the top to the bottom the same way that the stone runs to throw the finer dust of flour downward. Two pipes or spouts, C C, more or less, lead from the upper side of the curb $a$, being let in at about eight inches from the periphery to a long, square wooden box or condensing-trunk, D, located at any convenient point in the mill, at and over one end of which box is placed a fan-blower, E, which has a discharge-spout, F, leading outside of the mill to the open air. The fan-blower E is operated by suitable connection with the machinery of the mill to give it high velocity and a powerful suction capacity, which is regulated according to the velocity of the millstones by means of sliding valves $c\,c$ placed at the entrance of the spouts C C into the condenser D, by which the strength of the current of air drawn between the stones is perfectly adjusted as required, and the grinding process is thus kept completely under the control of the miller. The top of the runner is made smooth and flat at or near and around the eye, and on the inside of the curb is fastened a sheep-skin valve, $e$, with the wool pressed down upon the stone sufficiently to stop the passage of air freely, in order that the current of fresh air entering the eye shall all pass down between the stones, and the suction power of the fan-blower shall operate only on the air which has thus passed through the stones and into the curb to be drawn up through the spouts C C by the fan-blower E through the condenser D, and finally discharged outside of the mill through the spout F. The condenser D has discharge-spouts G G under the ends, and a block or sweep, $g$, fitted inside, which may be drawn back and forth from one end to the other by cords $h\,h$ that pass through the ends of the box, in order to clean it occasionally of the matters deposited by the condensation of the steam, and sweep them into the discharge-spouts G G.

Having thus described my invention, what I claim therein as new, and desire to secure by Letters Patent, is—

1. The fan-blower E, arranged in relation with the box D, constructed as described, spouts C C, and millstones, as herein set forth for the purpose specified.

2. The box D, constructed as described, provided with the discharge-spouts G G at each end, and having the cleaning-sweep g, operated by means of the cord h, as herein set forth for the purpose specified.

3. The oblong box D, inclined spouts C, and fan-blower E, arranged in relation with each other and with the millstone, as herein set forth for the purpose specified.

The above specification of my invention signed by me this 18th day of February, 1867.

JOHN GRAY.

Witnesses:
 JOHN B. LONGUEVILLE,
 THOS. A. MCCARRON.